United States Patent [19]

Ohashi et al.

[11] 4,401,013
[45] Aug. 30, 1983

[54] AIR CONDITIONING DEVICE

[75] Inventors: Toshio Ohashi; Yoshihiko Muto; Masaru Takasaki, all of Yokohama, Japan

[73] Assignee: Nissan Motor Co., Ltd., Yokohama, Japan

[21] Appl. No.: 258,626

[22] Filed: Apr. 29, 1981

[30] Foreign Application Priority Data

May 6, 1980 [JP] Japan .............................. 55-60595[U]

[51] Int. Cl.³ ............................................. B60H 3/00
[52] U.S. Cl. ........................................ 98/2.11; 98/2.04; 165/42; 261/DIG. 4
[58] Field of Search ................... 98/2.04, 2.11, 2.05; 261/DIG. 4, 142; 165/42, 43

[56] References Cited

U.S. PATENT DOCUMENTS

| | | | |
|---|---|---|---|
| 2,717,148 | 9/1955 | Hall | 98/2.11 X |
| 2,720,149 | 10/1955 | Groene | 98/2.04 X |
| 2,725,605 | 12/1955 | Haltenberger | 98/2.04 |
| 2,761,291 | 9/1956 | Golding | 98/2.11 |
| 2,853,932 | 9/1958 | Freydl | 98/2.04 X |
| 2,970,456 | 2/1961 | Rice | 98/2.11 X |
| 3,286,617 | 11/1966 | Shirk | 98/2.04 X |
| 3,329,077 | 7/1967 | Grosso | 98/2.11 |
| 3,718,281 | 2/1973 | Beatenbough et al. | 237/12.3 A X |
| 4,319,519 | 3/1982 | Parsson | 98/2.11 |

Primary Examiner—William E. Tapolcai

[57] ABSTRACT

An auxiliary air conditioning device is mounted to a rear parcel shelf above a trunk room of a motor vehicle for assisting a major air conditioning device. The auxiliary air conditioning device has therein an air cleaner and at least one of an electric heater and an electric humidifier.

1 Claim, 11 Drawing Figures

AIR CONDITIONING DEVICE

BACKGROUND OF THE INVENTION

The present invention relates in general to an air conditioning device used in a motor vehicle, and more particularly to an auxiliary air conditioning device which is mounted on a rear parcel shelf of a passenger motor vehicle for assisting a major air conditioning device mounted on the vehicle.

SUMMARY OF THE INVENTION

According to the present invention, there is proposed an air conditioning device for use in a motor vehicle having a passenger compartment and a trunk room, the passenger compartment and the trunk room being isolated from each other and bounded by a partition wall. The air conditioning device comprises a housing mounted to the partition wall, the housing having an air intake passage and an air discharge passage which are both open to the interior of the passenger compartment; a fan arranged in the housing for generating an air flow in the housing in a direction from the air intake passage to the air discharge passage; an air cleaner arranged in the housing at a position upstream of the fan for cleaning the air which passes through the housing and means for conditioning the air in the housing, the means being at least one of an electric heater and an electric humidifier.

It is an object of the present invention to provide an air conditioning device which is used as an auxiliary of a major air conditioning device mounted on the vehicle.

DETAILED DESCRIPTION OF THE PRESENT INVENTION

Prior to describing the invention, a conventional air cleaning device mounted to a rear parcel shelf of a passenger motor vehicle will be described with reference to FIG. 1 in order to clarify the invention.

Figure 1:
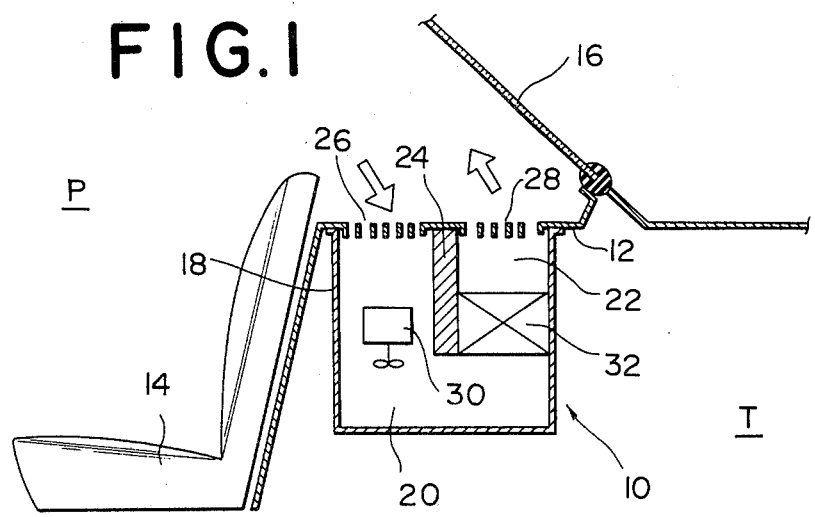
FIG. 1 is an illustration of a conventional air cleaning device mounted to a rear parcel shelf of a passenger motor vehicle.

Referring to FIG. 1, there is shown a conventional air cleaning device 10 which is arranged to project into a trunk room T of the passenger motor vehicle at a position under a rear parcel shelf 12 behind a rear passenger seat 14, as shown. Designated by numeral 16 is a rear window pane which is located above the rear parcel shelf 12.

The air cleaning device 10 comprises a housing 18 in which an air intake passage 20 and an air discharge passage 22 are defined by a partition member 24. The housing 18 is secured to the parcel shelf 12. Air intake openings 26 and air discharge openings 28 are formed in the rear parcel shelf 12 at positions to communicate with the air intake and discharge passages 20 and 22, respectively. An electric fan 30 is arranged in the air intake passage 20 for drawing the passenger compartment air into the passage 20 through the air intake openings 26. An air cleaner proper 32, such as an electrostatically operated air cleaner or a mechanical filter type air cleaner, is arranged in the air discharge passage 22 as shown.

With the construction mentioned above, the air in the passenger compartment is drawn through the air intake openings 26 into the interior of the device 10 by the action of the electric fan 30. During flowing in the device 10, the air is cleaned by the air cleaner proper 32 and discharged into the passenger compartment through the air discharge openings 28. The cleaned air from the air discharge openings 28 flows along the rear window pane 16 and then spreads over the passenger compartment P.

In this conventional air cleaning device 10, however, the following problems arise.

First, since the entire of the air cleaning device 10 is projected into the trunk room T, the housing 18 and the other parts of the device 10 are easily affected by the temperature of the trunk room T which is usually isolated from the passenger compartment P. Thus, in winter, even if the air in the passenger compartment P has been warmed to have a comfortable temperature by an air conditioner or a heater mounted on the vehicle, the air fed into the cleaning device 10 is subjected to temperature drop causing a cooled air discharging from the openings 28. Of course, this undesired phenomenon gives the passengers on the rear seat 14 an unpleasant feeling.

Second, since the air cleaning device 10 has only the air cleaning function, it is impossible to deal with an over-dried condition in the passenger compartment which condition may be caused by the dehumidification effect brought by a long time heating or cooling by a heater or a cooler mounted to the vehicle. The over-dried condition of air will cause the passengers to have a sore throat and a problem in the nasal nucous membrane.

The present invention is proposed by taking the above-mentioned problems into consideration.

The present invention will be described in detail with reference to the attached drawings which show the embodiments. Similar parts to those of FIG. 1 are designated by the same numerals throughout the drawings.

Figure 2A:
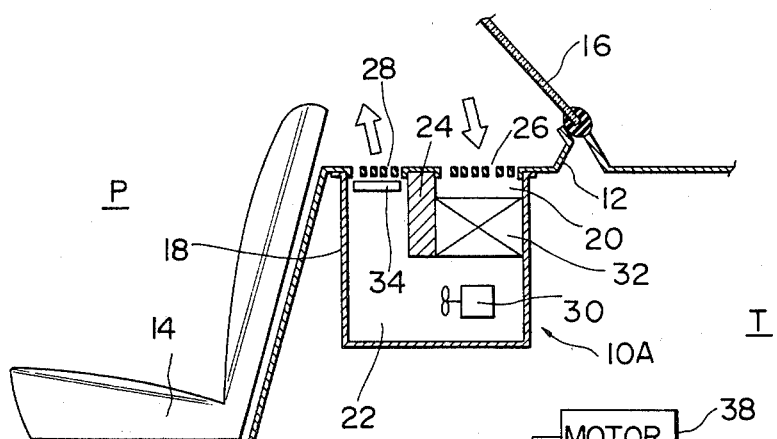
FIG. 2A is an illustration similar to FIG. 1, but shows a first embodiment of the present invention.
Figure 2B:
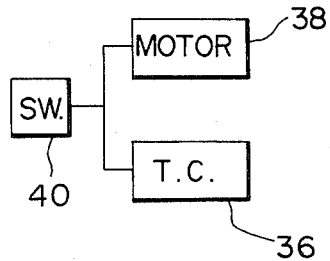
FIG. 2B is a block diagram of a control circuit of the device of FIG. 2A.

Referring to FIGS. 2A and 2B, there is shown a first embodiment of the present invention. Similar to the before-mentioned conventional air cleaning device, the air conditioning device 10A of this embodiment is mounted to the rear parcel shelf 12 to project into the trunk room T. The device 10A comprises a housing 18 secured to the parcel shelf 12. The housing 18 has an air intake passage 20 and an air discharge passage 22 which are bounded by a partition member 24. Air intake openings 26 and air discharge openings 28 are formed in the rear parcel shelf 12 to respectively communicate with the air intake and discharge passages 20 and 22. An air cleaner proper 32 is located in the air intake passage 20. An electric fan 30 is located in the air discharge passage 22 upstream of an electric heater 34 which is located in the air discharge passage 20 near the air discharge openings 28 as shown. The heater 34 has a temperature controller 36 such as a PTC thermometer, and is connected electrically to a motor 38 of the electric fan 30. The temperature controller 36 and the electric fan motor 38 are connected to a common switch 40 and operate when the switch 40 takes ON position.

With the above-mentioned construction, the passenger compartment air fed into the device 10A is first treated by the air cleaner proper 32 to be cleaned and then warmed by the heater 34 and then discharged into the passenger compartment P through the air discharge openings 28. By the provision of the heater 34, the above mentioned undesired phenomenon does not occur.

Figure 3:
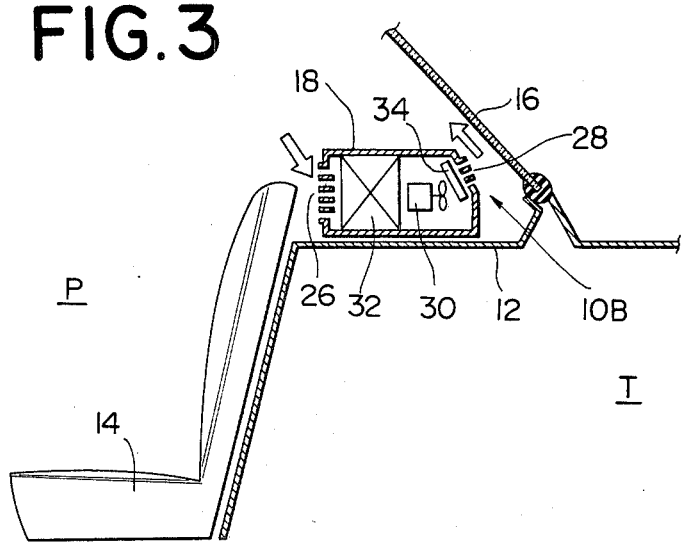
FIGS. 3, 4, 5, 6, 7, 8, 9 and 10 are illustrations similar to FIG. 1, but show respectively second, third, fourth, fifth, sixth, seventh, eighth and ninth embodiments of the present invention.

Referring to FIG. 3, there is shown a second embodiment of the present invention. The air conditioning device 10B of this embodiment is constructed small and mounted on the rear parcel shelf 12. The device 10B comprises a housing 18 mounted on the rear parcel shelf 12. The housing 18 has air intake openings 26 and air discharge openings 28 which are formed at opposed side walls of the housing 18 as shown. An air cleaner proper 32 is located near the air intake openings 26, while an electric heater 34 is located near the air discharge openings 28. An electric fan 30 is located between the air cleaner proper 32 and the electric heater 34. Since the entire of the air conditioning device 10B is arranged on the rear parcel shelf 12, that is, the device 10B has no portion which is projected into the trunk room T, the effect which the trunk room temperature applies to the air which flows in the device 10B is minimized.

Figure 4:
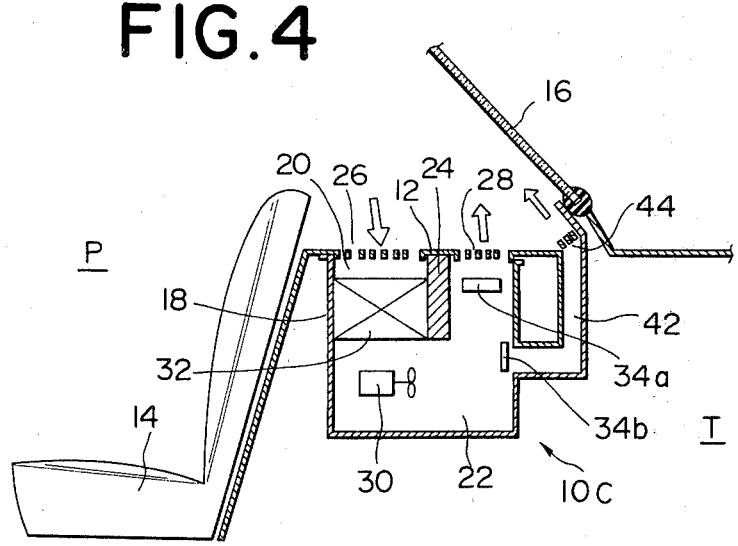

Referring to FIG. 4 of the drawings, there is shown a third embodiment of the present invention. Similar to the first embodiment of FIG. 2A, the air conditioning device 10C of the third embodiment is mounted to the rear parcel shelf 12 to project into the trunk room T. The device 10C comprises a housing 18 secured to the rear parcel shelf 12. The housing 18 has an air intake passage 20 and an air discharge passage 22 which are bounded by a partition member 24. Air intake openings 26 and air discharge openings 28 are formed in the rear parcel shelf 12 at positions to communicate with the air intake and discharge passages 20 and 22 respectively. An air cleaner proper 32 is located in the air intake passage 32 and an electric fan 30 is located in an upstream portion of the air discharge passage 22. Two electric heaters 34a and 34b are arranged in the air discharge passage 22, one of which is positioned near the air discharge openings 28, as shown. An additional passage 42 is branched from the air discharge passage 22 and terminates at a base section of the rear window pane 16. The other electric heater 34b is positioned near the entrance of the additional passage 42. A grille 44 is fixed to the exit portion of the additional passage 42, as shown. With this construction, the heated air discharged from the additional passage 42 is forced to flow along the rear window pane 16 thereby to prevent the pane 16 from being frosted.

Figure 5:
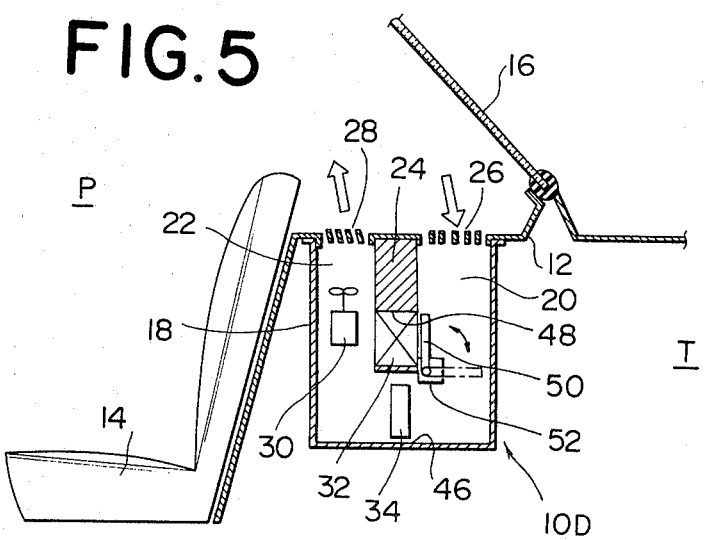

Referring to FIG. 5, there is shown a fourth embodiment of the present invention. The air conditioning device 10D of this embodiment comprises a housing 18 which has an air intake passage 20 and an air discharge passage 22. These two passages 20 and 22 are connected by two parallelly arranged passages 46 and 48. An air cleaner proper 32 is located in the passage 48 and an electric heater 34 is in the other passage 46. A damper door 50 is swingably arranged in the air intake passage 20 to selectively open and close the passages 48 and 46. Air intake openings 26 and air discharge openings 28 are formed in the rear parcel shelf 12 at positions to respectively communicate with the air intake and discharge passages 20 and 22. Designated by numeral 52 is an electric switch which closes a circuit between the heater 34 and an electric power source (not shown) when the damper door 50 opens the passage 46 for the heater 34, and opens the circuit when the door 50 closes the passage 46. (If the air cleaner proper 32 is of an electric type, the ON-OFF operation of the electric air cleaner proper 32 is so controlled as to be reversed to that of the electric heater 34.) When purification of the passenger compartment air is merely required, the damper door 50 takes a position to close the passage 46 for the heater 34. Thus, the air drawn into the air intake passage 20 is forced to flow through the air cleaner proper 32. Thus, from the air discharge openings 26, the air thus cleaned is discharged into the passenger compartment P. While, when warming of air by the device 10D is required, the damper door 50 takes the other position to open the passage 46 for the heater 34. Thus, the air drawn into the air intake passage 20 is forced to flow through the heater 34 without flowing through the air cleaner proper 32, so that from the air discharge openings 28, warmed air is discharged into the passenger compartment P. This operation compensates the temperature drop which may be caused by the construction of the air conditioning device 10D projected into the trunk room T.

Figure 6:
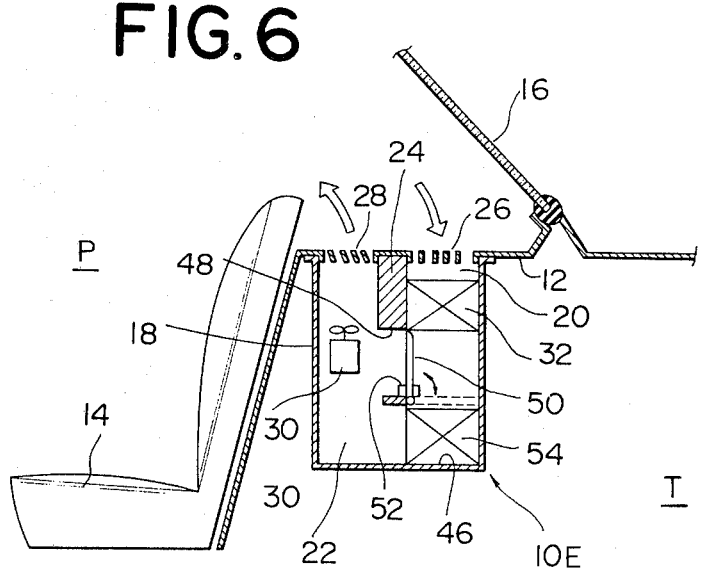

Referring to FIG. 6, there is shown a fifth embodiment of the present invention. The air conditioning device 10E of this embodiment uses a humidifier 54 as a substitute for the heater 34 and comprises a housing mounted to the rear parcel shelf 12 to project into the trunk room T. The housing 18 has an air intake passage 20 and an air discharge passage 22 which are connected by two independent passages 46 and 48. An air cleaner proper 32 is located in the air intake passage 20 and an electric fan 30 is in the air discharge passage 22. The humidifier 54 is arranged in the passage 46. A damper door 50 is swingably arranged in the housing 18 to selectively open and close the passages 46 and 48. Thus, when the damper door 50 takes a position to open the passage 46 for the humidifier 54, the air which has been cleaned by the air cleaner proper 32 is forced to flow through the humidifier 54 to be damped and then discharged from the air discharge openings 28 into the passenger compartment P. While, when the damper door 50 takes the other position to open the passage 48 and simultaneously close the passage 46, the air which has been cleaned by the air cleaner proper 32 is directly discharged from the air discharge openings 28 into the passenger compartment P without flowing through the humidifier 54. Thus, the problem of the over dryness of air in the passenger compartment P is solved. If desired, an electric switch 52 may be connected to the damper door 50. The switch 52 is designed to close the circuit between the humidifier 54 and an electric power source (not shown) when the damper door opens the passage 46, and open the circuit when the damper door 50 closes the passage 46. Further, if desired, a cooler may be used as a substitute for the humidifier 54.

Figure 7:
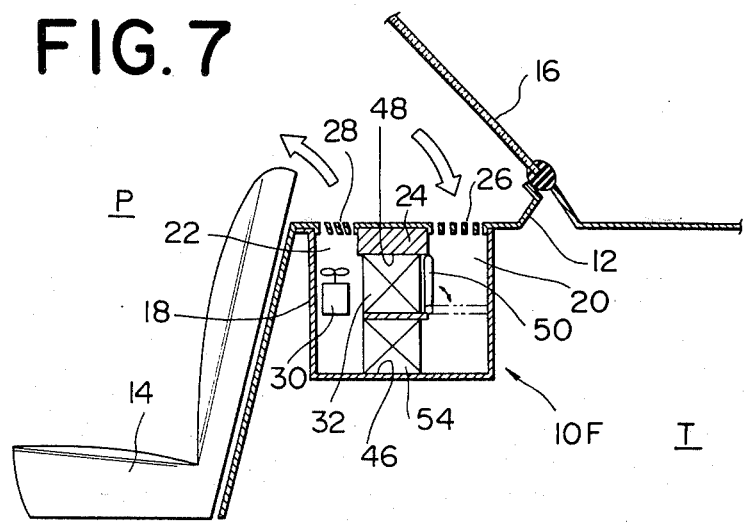

Referring to FIG. 7, there is shown a sixth embodiment of the present invention. The air conditioning device 10F of this embodiment comprises a housing 18. The housing 18 has an air intake passage 20 and an air discharge passage 22 which are connected by two parallelly arranged passages 46 and 48. An air cleaner proper 32 is located in the passage 48 and a humidifier 54 is in the other passage 46. An electric fan 30 is arranged in the air discharge passage 22. A damper door 50 is swingably arranged in the housing 18 to selectively open and close the passages 46 and 48. Thus, when the damper door 50 takes a position to open the passage 46 and simultaneously close the passage 48 as shown by the solid line, the air drawn into the air intake passage 20 is forced to flow through only the humidifier 54 to be damped and then discharged from the air discharge openings 28 into the passenger compartment P. While, when the damper door 50 takes the other position to close the passage 46 and simultaneously open the passage 48 as shown by the phantom line, the air drawn into the air intake passage 20 is forced to flow through only the air cleaner proper 32 to be cleaned and then discharged into the passenger compartment P. Although not shown in the drawing, an electric switch may be connected to the damper door 50. In this case, the electric switch is designed to close the circuit between the electric humidifier 54 and an electric power source (not shown) when the damper door 50 opens the passage 46, and open the circuit when the damper door 50 closes the passage 46. If the air cleaner proper 32 is of an electric type, the operation of the electric air cleaner 32 is so controlled as to be reversed to that of the humidifier 54.

Figure 8:
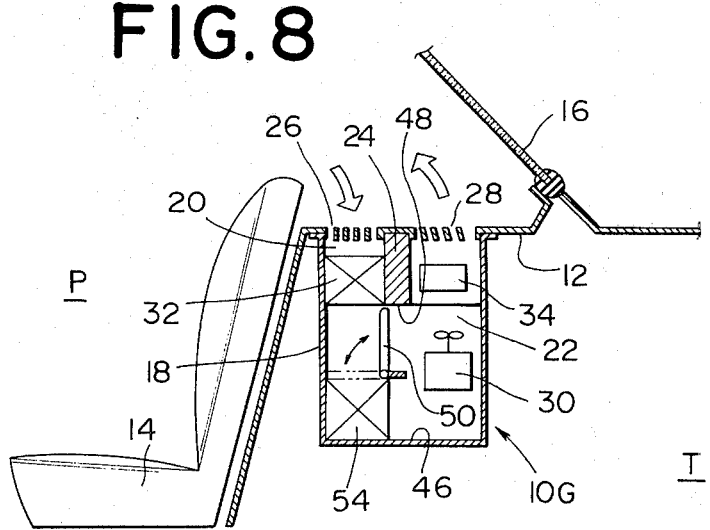

Referring to FIG. 8, there is shown a seventh embodiment of the present invention. The air conditioning device 10G of this embodiment comprises a housing 18. The housing 18 has an air intake passage 20 and an air discharge passage 22 which are connected by two independent passages 46 and 48. An air cleaner proper 32 is arranged in the air intake passage 20, an electric heater 34 is in the air discharge passage 22 and an electric humidifier 54 is in the passage 46, as shown. An electric fan 30 is arranged in the air discharge passage 22 at the position upstream of the heater 34. A damper door 50 is swingably arranged in the housing to selectively close and open the passages 46 and 48. Thus, when the damper door 50 takes a position to open the passage 46 and simultaneously close the other passage 48 as shown by the solid line, the air drawn into the air intake passage 20 is forced to flow through the air cleaner proper 32, the humidifier 54 and the electric heater 34 in this order, so that cleaned, damped and warmed air is discharged from the air discharge openings 28 into the passenger compartment P. While, when the damper door 50 takes the other position to close the passage 46 and simultaneously open the passage 48 as shown by the phantom line, the air which has been passed through the air cleaner proper 32 is forced to flow toward the electric heater 34 without flowing through the humidifier 54. Thus, under this condition, cleaned and warmed air is discharged into the passenger compartment P.

Figure 9:
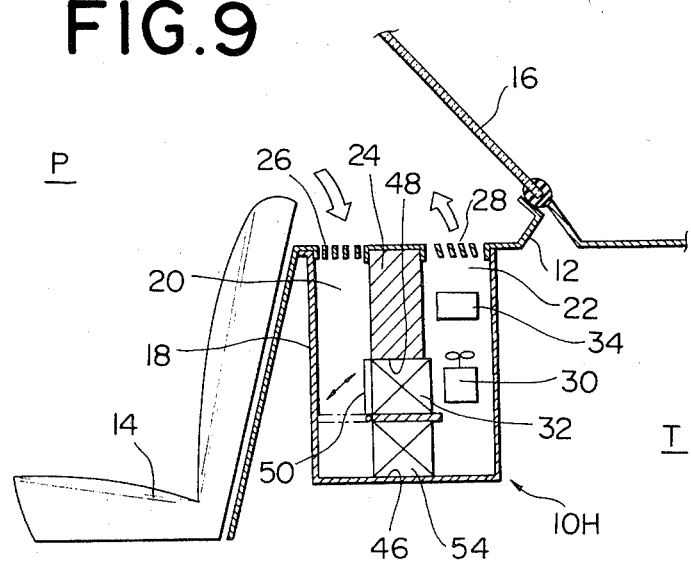

Referring to FIG. 9, there is shown an eighth embodiment of the present invention. The air conditioning device 10H of this embodiment comprises a housing 18 secured to the rear parcel shelf 12. The housing 18 has an air intake passage 20 and an air discharge passage 22 which are connected by two parallelly arranged passages 46 and 48. An air cleaner proper 32 is arranged in the passage 48 and an electric humidifier 54 is in the other passage 46. An electric heater 34 is arranged in the air discharge passage 22 at a position downstream of an electric fan 30 which is also located in the air discharge passage 22. A damper door 50 is swingably arranged in the air intake passage 20 to selectively open and close the two parallelly arranged passages 46 and 48. Thus, when the damper door 50 takes a position to open the passage 46 and simultaneously close the other passage 48 as shown by the solid line, the air drawn into the air intake passage 20 is forced to flow through the electric humidifier 46 to be damped and then through the electric heater 34 to be warmed. Thus, damped and warmed air is discharged from the air discharge openings 28 into the passenger compartment P. While, when the damper door 50 takes the other position to close the passage 46 and simultaneously open the passage 48 as shown by the phantom line, the air drawn into the air intake passage 20 is forced to flow through the air cleaner proper 32 and then through the electric heater 34. Thus, from the air discharge openings 28, cleaned and warmed air is discharged into the passenger compartment P.

Figure 10:
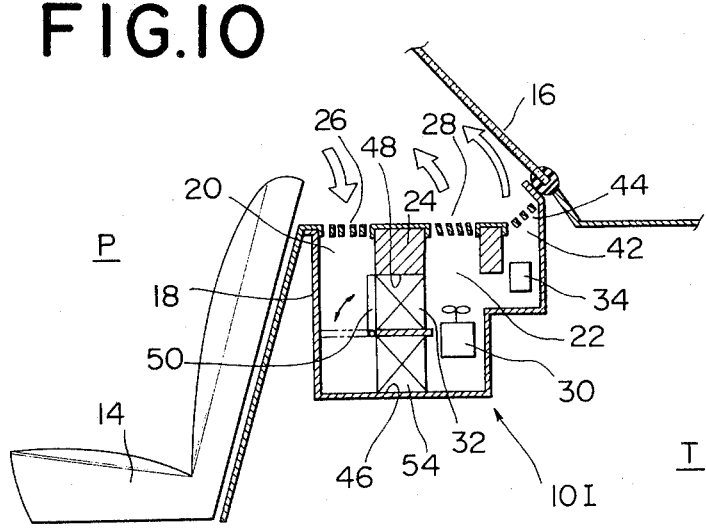

Referring to FIG. 10, there is shown a ninth embodiment of the present invention. The air conditioning device 10I of this embodiment is a slight modification of the device 10H of the above-mentioned eighth embodiment. In the ninth embodiment, an additional passage 42 is branched from the air discharge passage 22 at a position downstream of the electric fan 30 and terminates at the base section of the rear window pane 16. A grille 44 is fixed to the exit portion of the additional passage 42. The electric heater 34 is located in the additional passage 42. With this construction, the heated air in the additional passage 42 is forced to flow along the rear window pane 16 thereby preventing the pane 16 from being frosted.

As is described in the foregoing, the air conditioning device according to the present invention is constructed to have at least one of a heater and a humidifier in addition to the air cleaner proper. Thus, the problems which have been encountered in the conventional air cleaning device are solved.

What is claimed is:

1. In a motor vehicle having a passenger compartment and a trunk which are isolated from each other and bounded by a partition wall, an air conditioning device comprising:
   a housing secured to said partition wall so as to project into said trunk, said housing having an air intake passage and an air discharge passage which are both open to the interior of said passenger compartment through respective openings formed in said partition wall, said housing also having first and second independent passages by which said air intake and discharge passages are connected independently of each other;
   an air cleaner disposed in said air intake passage for cleaning air passing therethrough;
   an electric heater disposed in said air discharge passage for warming air passing therethrough, adjacent said partition wall;
   a humidifier disposed in said first independent passage for damping air passing therethrough;
   an electric fan disposed in said air discharge passage for producing air flow in a direction from said air intake passage to said air discharge passage through said first and second independent passages; and
   a damper door swingably disposed in said housing to selectively open and close said first and second independent passages.

* * * * *